(12) United States Patent
Anderberg et al.

(10) Patent No.: US 11,438,497 B2
(45) Date of Patent: Sep. 6, 2022

(54) MANAGING MULTIPLE IMAGE DEVICES

(71) Applicants: Sony Corporation, Tokyo (JP); Sony Pictures Entertainment Inc., Culver City, CA (US)

(72) Inventors: Tobias Anderberg, Los Angeles, CA (US); Scott Metzger, Los Angeles, CA (US)

(73) Assignees: Sony Group Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 0 days.

(21) Appl. No.: 16/874,246

(22) Filed: May 14, 2020

(65) Prior Publication Data

US 2021/0185218 A1     Jun. 17, 2021

Related U.S. Application Data

(60) Provisional application No. 62/947,716, filed on Dec. 13, 2019.

(51) Int. Cl.
| | |
|---|---|
| *H04N 5/232* | (2006.01) |
| *G08B 13/196* | (2006.01) |
| *H04N 5/33* | (2006.01) |
| *H04N 7/18* | (2006.01) |
| *H04N 5/247* | (2006.01) |

(52) U.S. Cl.
CPC ..... *H04N 5/23206* (2013.01); *G08B 13/1966* (2013.01); *G08B 13/19689* (2013.01); *H04N 5/23216* (2013.01)

(58) Field of Classification Search
CPC .......... H04N 5/23206; H04N 5/23216; G08B 13/19689
See application file for complete search history.

(56) References Cited

U.S. PATENT DOCUMENTS

| | | | |
|---|---|---|---|
| 7,242,295 | B1 | 7/2007 | Milinusic et al. |
| 2001/0037406 | A1* | 11/2001 | Philbrick .............. H04L 67/325 709/250 |
| 2015/0237252 | A1 | 8/2015 | O'Donnell et al. |
| 2015/0381888 | A1* | 12/2015 | Su .......................... H04N 7/181 348/207.11 |
| 2017/0171442 | A1 | 6/2017 | Spielberg |
| 2018/0160042 | A1* | 6/2018 | He ..................... H04N 5/23293 |
| 2019/0037800 | A1* | 2/2019 | Betts-Lacroix .......... A61B 5/16 |

\* cited by examiner

*Primary Examiner* — Christopher K Peterson
(74) *Attorney, Agent, or Firm* — Procopio, Cory, Hargreaves & Savitch LLP

(57) ABSTRACT

Managing device settings on multiple devices, including: creating a first group of devices including two or more devices, wherein each device in the first group has at least one first device setting; creating a second group of devices including two or more devices, wherein each device in the second group has at least one second device setting and each device in the second group is not in the first group; sending the at least one first device setting to each device in the first group of devices in parallel, so that each device in the first group changes at least one device setting according to the at least one received first device setting; and sending the at least one second device setting to each device in the second group of devices in parallel, so that each device in the second group changes at least one device setting according to the at least one received second device setting.

16 Claims, 4 Drawing Sheets

MANAGING MULTIPLE IMAGE DEVICES

CROSS-REFERENCE TO RELATED APPLICATIONS

This application claims the benefit of priority under 35 U.S.C. § 119(e) of U.S. Provisional Patent Application No. 62/947,716, filed Dec. 13, 2019, entitled "Managing Multiple Image Devices with Per Device Type Settings." The disclosure of the above-referenced application is incorporated herein by reference.

BACKGROUND

Field

The present disclosure relates to managing image devices, and more specifically, to grouping the image devices by type and managing various device settings in parallel.

Background

Conventional workflow when working with multiple image streaming devices, such as web cameras, surveillance cameras, machine vision cameras, and other similar image devices, is to configure each device separately and sequentially. The time needed to manage this process scales linearly as more devices are added. If it takes 5 seconds to configure a single device, it will take 2.5 minutes to configure 30 of them. This sequential process can prove to be very detrimental to the workflow and management of the devices, as well as being very error prone as it is easy to set or dial in the wrong settings for one or more devices.

SUMMARY

The present disclosure provides for grouping the image devices by type and managing various device settings in parallel.

In one implementation, a method for managing device settings on multiple devices is disclosed. The method includes: creating a first group of devices including two or more devices, wherein each device in the first group has at least one first device setting; creating a second group of devices including two or more devices, wherein each device in the second group has at least one second device setting and each device in the second group is not in the first group; sending the at least one first device setting to each device in the first group of devices in parallel, so that each device in the first group changes at least one device setting according to the at least one received first device setting; and sending the at least one second device setting to each device in the second group of devices in parallel, so that each device in the second group changes at least one device setting according to the at least one received second device setting.

In one implementation, each device in the first group has at least one characteristic in common with each of the other devices in the first group. In one implementation, the devices in the first group are infrared cameras and the devices in the second group are color cameras. In one implementation, the at least one first device setting is sent to each device in the first group of devices in parallel using task queues. In one implementation, the at least one second device setting is sent to each device in the second group of devices in parallel using task queues. In one implementation, the method further includes connecting the first group of devices and the second group of devices to a host. In one implementation, the method further includes generating a network communication layer between the host and the first group of devices and the second group of devices. In one implementation, the network communication layer uses User Datagram Protocol (UDP).

In another implementation, a video system is disclosed. The system includes: a host device; a first plurality of devices coupled to the host device, wherein each device in the first plurality of devices has at least one first device setting, wherein the host device sends the at least one first device setting to each device in the first plurality of devices in parallel, so that each device in the first plurality of devices changes at least one device setting according to the at least one received first device setting; a second plurality of devices coupled to the host device, wherein each device in the second group has at least one second device setting, wherein each device in the second plurality of devices is not in the first plurality of devices, wherein the host device sends the at least one second device setting to each device in the second plurality of devices in parallel, so that each device in the second plurality of devices changes at least one device setting according to the at least one received second device setting.

In one implementation, each device in the first plurality of devices has at least one characteristic in common with each of the other devices in the first plurality of devices. In one implementation, the first plurality of devices includes infrared cameras and the second plurality of devices includes color cameras. In one implementation, the system further includes a third plurality of devices including monochrome cameras. In one implementation, the system further includes a network communication layer configured between the host and the first plurality of devices and the second plurality of devices using User Datagram Protocol (UDP). In one implementation, the system further includes a remote node coupled to the host device. In one implementation, at least one device of the first plurality of devices and the second plurality of devices is coupled to the host device through the remote node.

In another implementation, a non-transitory computer-readable storage medium storing a computer program to manage device settings on multiple devices is disclosed. The computer program includes executable instructions that cause a computer to: generate a first group of devices including two or more devices, wherein each device in the first group has at least one first device setting; generate a second group of devices including two or more devices, wherein each device in the second group has at least one second device setting and each device in the second group is not in the first group; transmit the at least one first device setting to each device in the first group of devices in parallel, so that each device in the first group changes at least one device setting according to the at least one received first device setting; and transmit the at least one second device setting to each device in the second group of devices in parallel, so that each device in the second group changes at least one device setting according to the at least one received second device setting.

In one implementation, the executable instructions that cause the computer to transmit the at least one first device setting comprise executable instructions that cause the computer to transmit the at least one first device setting to each device in the first group of devices in parallel using task queues. In one implementation, the executable instructions that cause the computer to transmit the at least one second device setting comprise executable instructions that cause the computer to transmit the at least one second device setting to each device in the second group of devices in parallel using task queues. In one implementation, the computer program further includes executable instructions that cause the computer to connect the first group of devices and the second group of devices to a host. In one implementation, the computer program further includes executable instructions that cause the computer to generate a network communication layer between the host and the first group of devices and the second group of devices using User Datagram Protocol (UDP).

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, a conventional workflow solution when working with multiple image streaming devices is to configure each device separately and sequentially, which can prove to be very detrimental to the workflow and management of the devices, as well as being very error prone as it is easy to set or dial in the wrong settings for one or more devices.

Certain implementations of the present disclosure provide a video system for implementing a technique for grouping image devices by type and managing various device settings in parallel, rather than acting on individual devices sequentially. In one implementation, task queues are used to manage device settings in parallel. This parallel operation can improve productivity and workflow speed, as well as removing mismatching configurations of devices. In one implementation, an image device includes a web camera, surveillance camera, machine vision camera, or another similar imaging device.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, the video system includes multiple types of image devices. Thus, the system groups related image devices by type (e.g., monochrome, infrared (IR), and color) to manage the various device settings. As stated above, the system operates on multiple devices in parallel, rather than acting on individual devices sequentially. Thus, the features provided in this implementation can include, but are not limited to, one or more of the following items: (1) organize a related set of devices into a group (e.g., monochrome, IR, color, etc.); (2) allow for a collection of device settings per group; (3) use a task queue or related work dispatcher for dispatching parallel work for all devices; (4) provide optimized network communication layer for remotely-connected nodes and devices; and (5) dynamically resize remote image stream for optimal data transfer.

Figure 1:
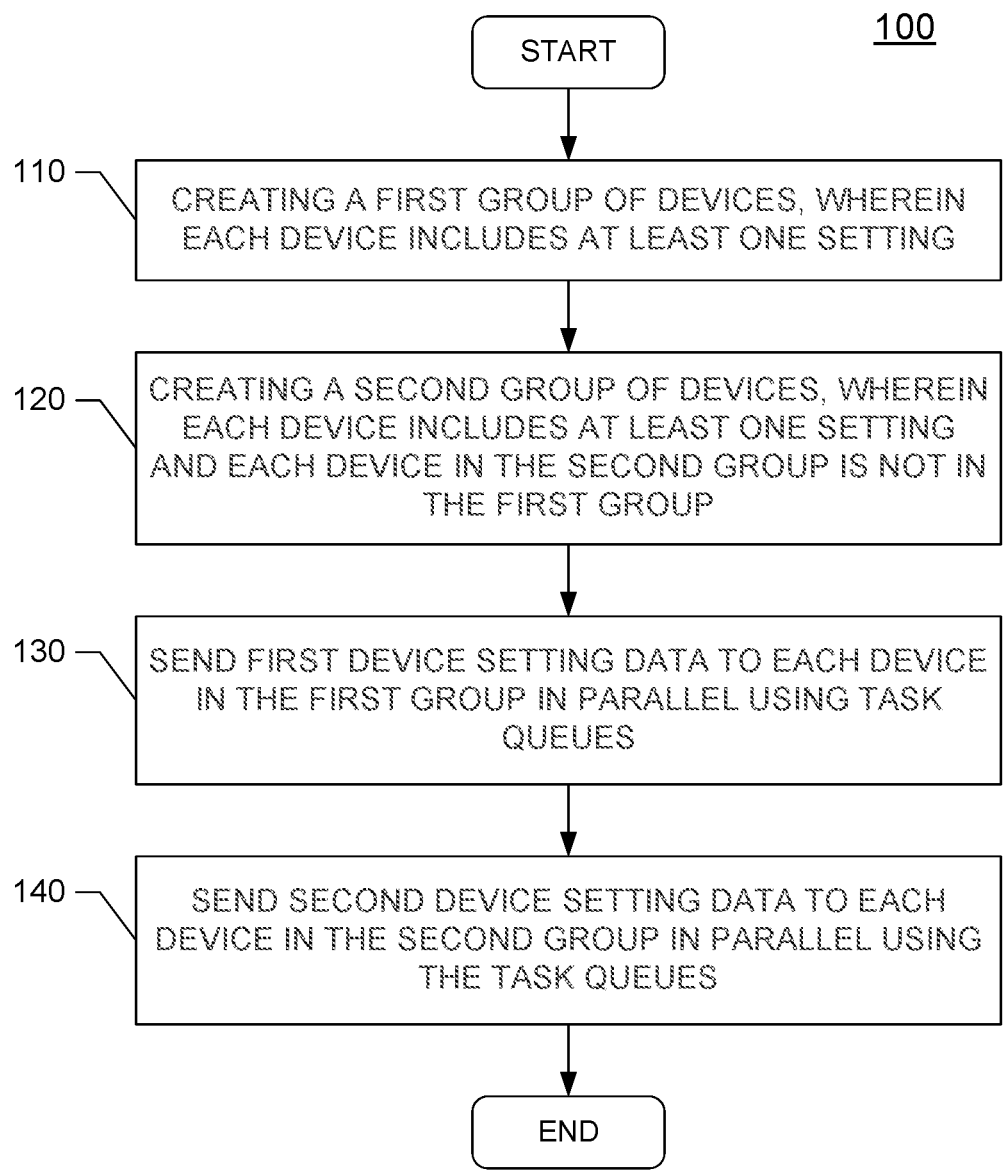
FIG. 1 is a flow diagram of a method for managing device settings on multiple devices in accordance with one implementation of the present disclosure.

FIG. 1 is a flow diagram of a method 100 for managing device settings on multiple devices in accordance with one implementation of the present disclosure. In the illustrated implementation of FIG. 1, a first group of devices including two or more devices is created, at step 110. Each device in the first group has at least one device setting. A second group of devices including two or more devices is created, at step 120. In the second group, each device has at least one device setting and each device in the second group is not in the first group. In one implementation, the creation of a group of devices includes generating a network communication layer between a host and nodes or devices, for example, utilizing optimized User Datagram Protocol (UDP).

At step 130, first device setting data is sent, at step 130, to each device in the first group of devices in parallel using task queues so that each of the devices in the first group changes at least one device setting according to the received first device setting data. Second device setting data is then sent, at step 140, to each device in the second group of devices in parallel using the task queues so that each of the devices in the second group changes at least one device setting according to the received second device setting data.

Figure 2A:
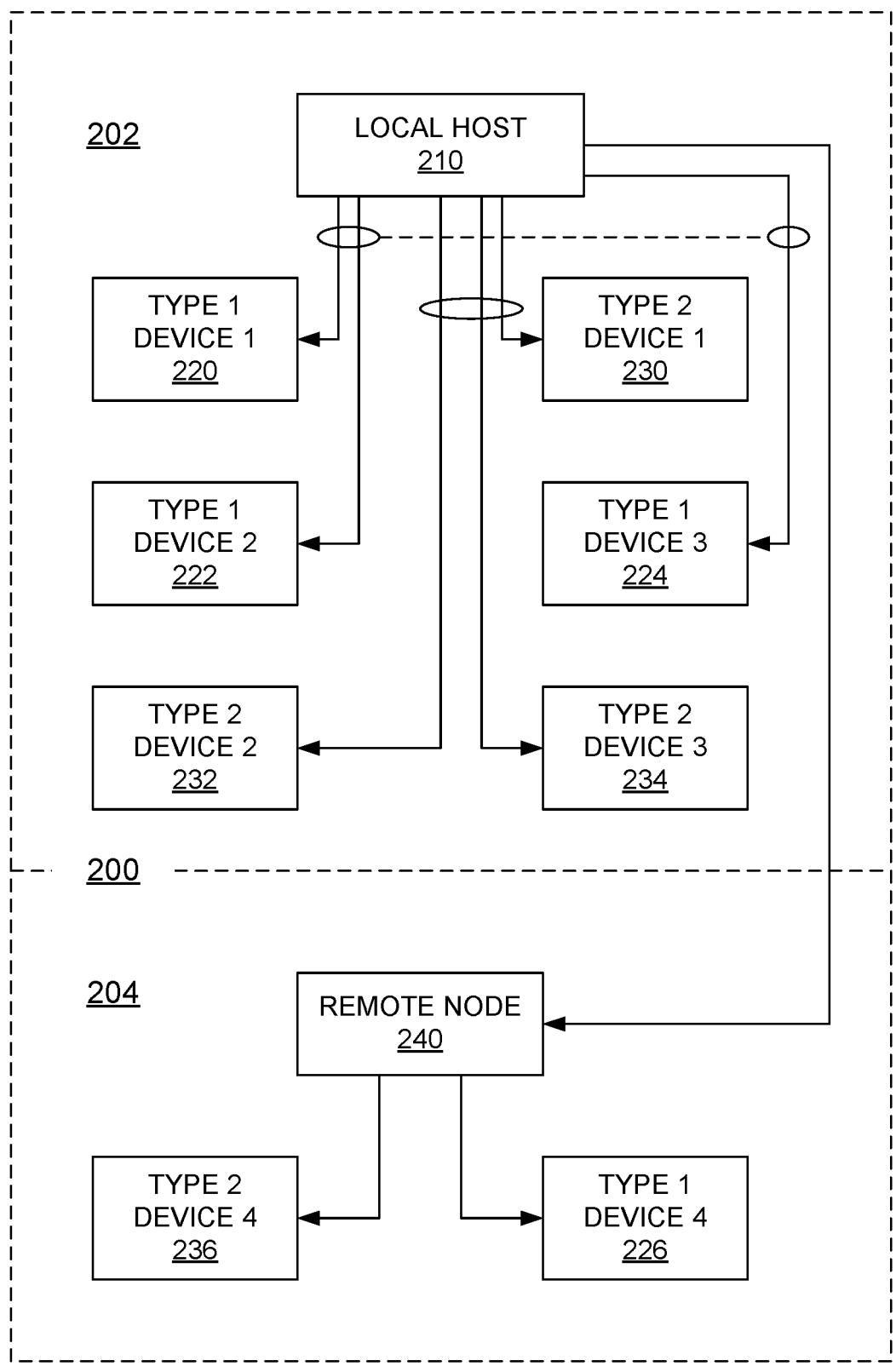
FIG. 2A is a block diagram of a video system including multiple types of image devices in accordance with one implementation of the present disclosure.

FIG. 2A is a block diagram of a video system 200 including multiple types (e.g., type 1 and type 2) of image devices in accordance with one implementation of the present disclosure. In the illustrated implementation of FIG. 2A, the system 200 groups related image devices by type, such as monochrome, IR, and color, to manage the various device settings. As stated above, the system operates on multiple devices in parallel, rather than acting on individual devices sequentially.

In one implementation, the video system 200 includes a combination of type 1 devices 220, 222, 224, 226 and type 2 devices 230, 232, 234, 236. For example, the type 1 devices include IR cameras and the type 2 devices include color cameras. Thus, in FIG. 2A, the cameras are grouped into two groups by their respective type. In other implementations, the cameras may include more than two types. Each group has a set of settings. In one implementation, the settings for the groups are the same. In another implementation, one group could have settings not present in other groups.

In one implementation, modifying a setting (e.g., "Exposure") in a group updates that setting simultaneously for all cameras associated with that group. By having a task queue that can execute many tasks in parallel, all cameras are updated concurrently. This also allows for a real-time visual feedback of all the cameras so that the result of the setting on all cameras can be seen immediately.

In one implementation, the video system 200 includes local devices 220, 222, 224, 230, 232, 234 connected to a local host 210 within a local environment 202. In another implementation, the video system 20 includes a combination of local devices 220, 222, 224, 230, 232, 234 connected to the local host 210 and remote devices 226, 236 connected to a remote node 240 within a remote environment 204. The benefit of the video system 200 when using the remote node 240 is that all the remote devices 226, 236 can be controlled with a single interface from the local host 210 to the remote node 240. It is not necessary to separately access or log into multiple remote devices and to configure settings for each device, or group of devices, on those separate devices. All the setting management can be done from the local host 210.

In one implementation, the centralization of setting management is accomplished by having an optimized network communication layer between the local host 210 and the remote nodes (e.g., remote node 240), and for example, utilizing optimized User Datagram Protocol (UDP). Further, dynamic resizing of image feeds reduces or minimizes data transfers to allow for real-time view of all the remote devices in a single interface on the local host. This type of setup provides benefits as the number of remote nodes and devices scale up. For example, a system of ten remote nodes and hundreds of devices becomes more easily managed, and can easily be controlled from a single host and interface.

This type of multi-device workflow management is applicable to a wide range of streaming image devices. For example, it is of particular use in an environment where there are multiple cameras of different types (e.g., in a volumetric capture system including a mixture of infrared cameras and color cameras).

Figure 2B:
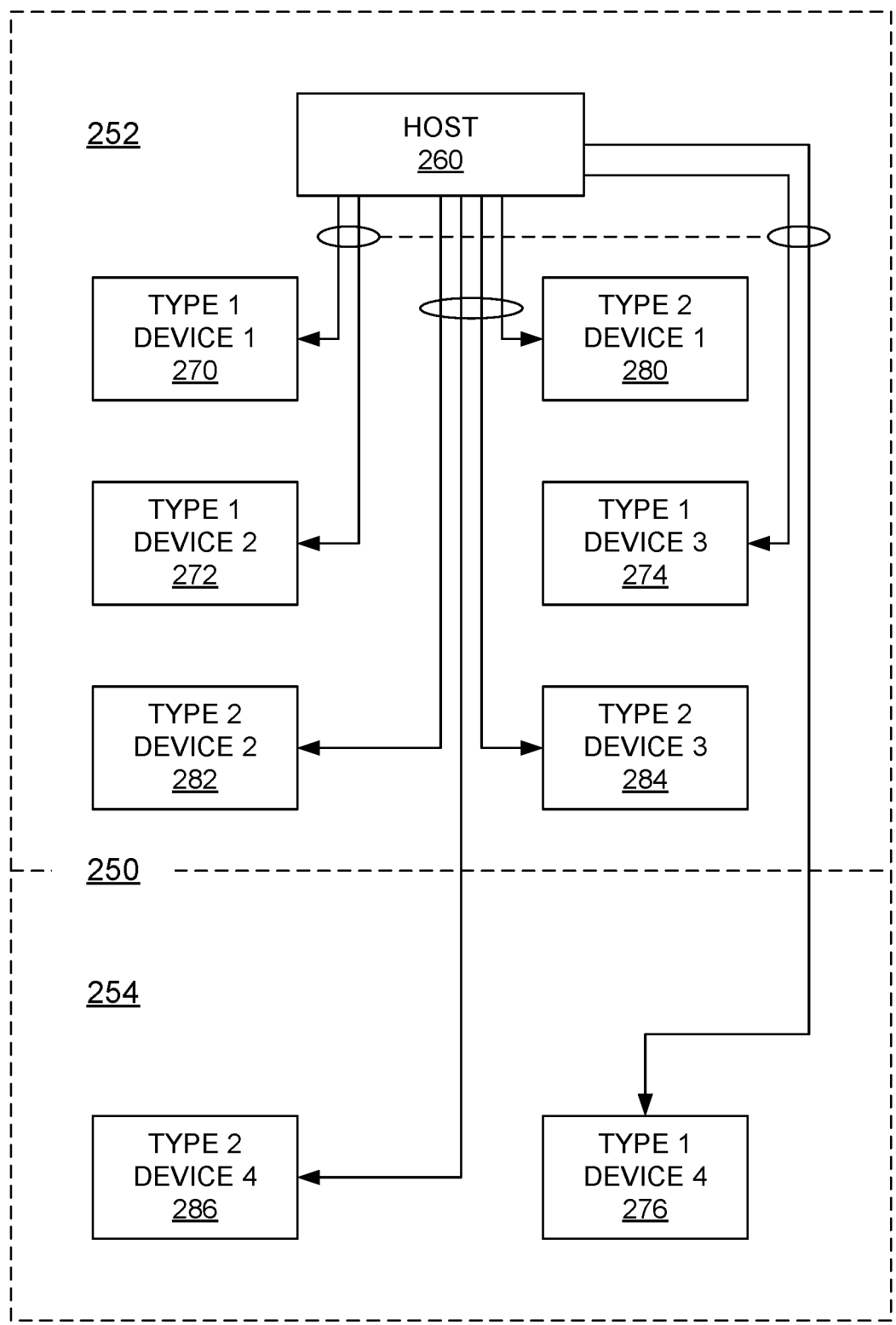
FIG. 2B is a block diagram of a video system including multiple types of image devices in accordance with another implementation of the present disclosure.

FIG. 2B is a block diagram of a video system 250 including multiple types (e.g., type 1 and type 2) of image devices in accordance with another implementation of the present disclosure. In the illustrated implementation of FIG. 2B, the system 250 groups related image devices by type, such as monochrome, IR, and color, to manage the various device settings. As stated above, the system operates on multiple devices in parallel, rather than acting on individual devices sequentially.

In one implementation, the video system 250 includes a combination of type 1 devices 270, 272, 274, 276 and type 2 devices 280, 282, 284, 286. For example, the type 1 devices include IR cameras and the type 2 devices include color cameras. Thus, in FIG. 2B, the cameras are grouped into two groups by their respective type. Each group has a set of settings. In one implementation, the settings for the groups are the same. In another implementation, one group could have settings not present in other groups.

In the implementation of FIG. 2B, the video system 250 includes a combination of local devices 270, 272, 274, 280, 282, 284 locted within a local environment 252 and remote devices 275, 286 located within a remote environment 254, with all devices connected to a single host 260. Thus, in contrast to the video system 200 of FIG. 2A, the video system 250 of FIG. 2B allows the local host 260 to control all devices 270, 272, 274, 276, 280, 282, 284, 286, 288 including remote devices 276, 286. That is, in the video system 250, the centralization of setting management is accomplished by having an optimized network communication layer between the local host 260 and all devices 270, 272, 274, 276, 280, 282, 284, 286, 288, and for example, utilizing optimized User Datagram Protocol (UDP). Further, the dynamic resizing of image feeds reduces or minimizes data transfers to allow for real-time view of all devices in a single interface on the local host.

Figure 3A:
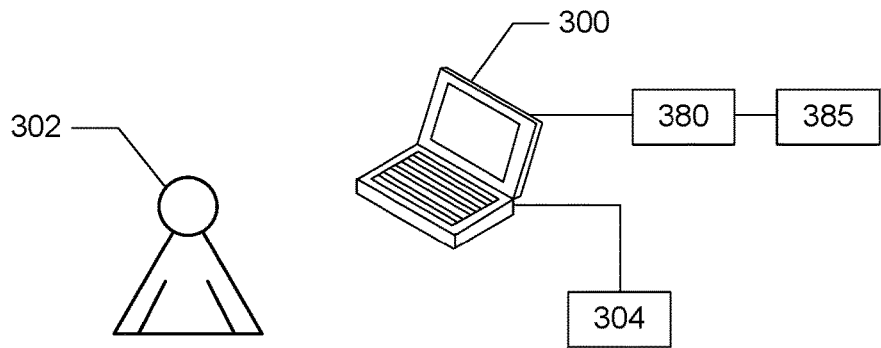
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement a video application 390 for implementing a technique for grouping image devices by type and managing various device settings in parallel as illustrated and described with respect to the method 100 and the systems 200, 250 in FIGS. 1, 2A, and 2B.

Figure 3B:
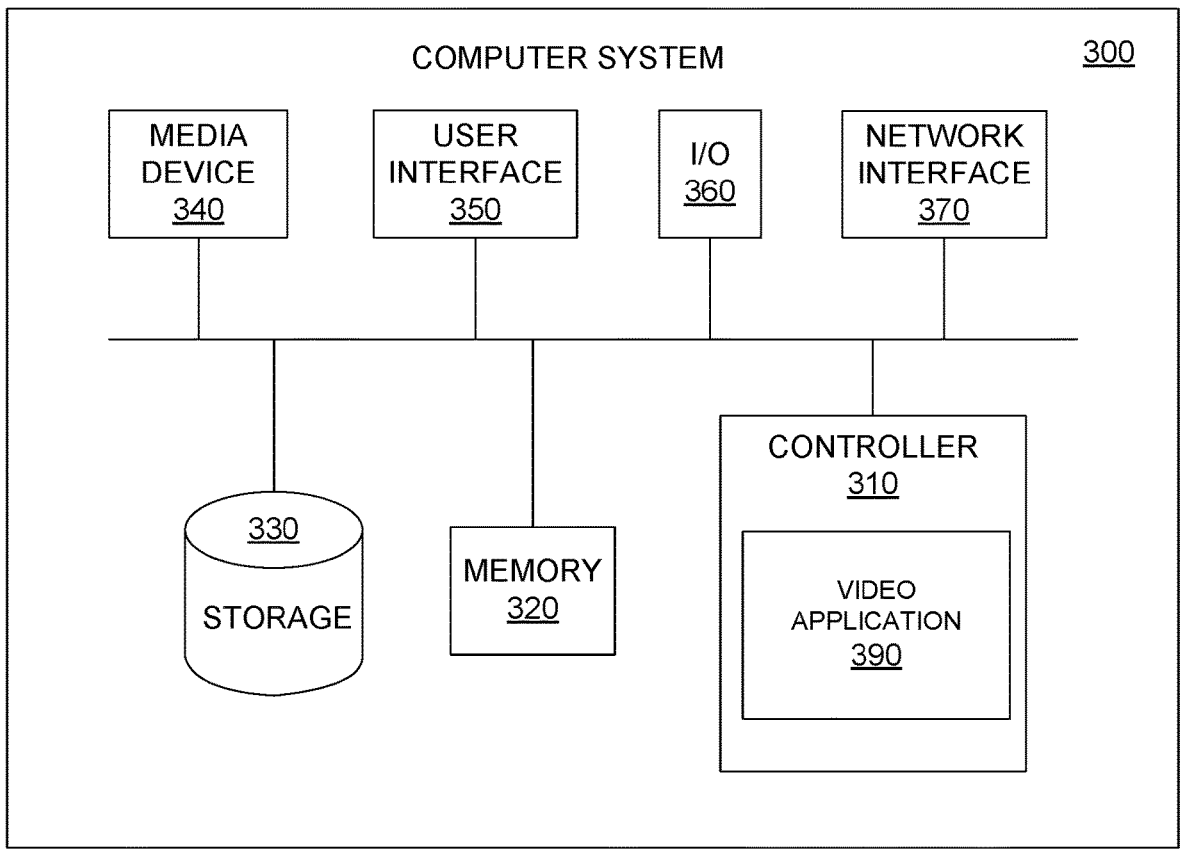
FIG. 3B is a functional block diagram illustrating the computer system hosting a video application in accordance with an implementation of the present disclosure.

The computer system 300 stores and executes the video application 390 of FIG. 3B. In addition, the computer system 300 may be in communication with a software program 304. Software program 304 may include the software code for the video application 390. Software program 304 may be loaded on an external medium such as a CD, DVD, or a storage drive, as will be explained further below.

Furthermore, computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the video application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the video application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the video application 390 with a software system, such as to enable the creation of groups of devices and transmission of device setting data in parallel using task queues. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the video application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for managing device settings on multiple devices, comprising:
    creating a first group of devices including two or more devices, wherein each device in the first group has at least one first device setting;
    creating a second group of devices including two or more devices, wherein each device in the second group has at least one second device setting and each device in the second group is not in the first group;
    sending the at least one first device setting to each device in the first group of devices in parallel, so that each device in the first group changes at least one device setting according to the at least one received first device setting,
    wherein the at least one received first device setting is sent in parallel using a first group of task queues to increase speed and remove mismatching configurations of the first group of devices; and
    sending the at least one second device setting to each device in the second group of devices in parallel, so that each device in the second group changes at least one device setting according to the at least one received second device setting,
    wherein the at least one received second device setting is sent in parallel using a second group of task queues to increase speed and remove mismatching configurations of the second group of devices.

2. The method of claim 1, wherein each device in the first group has at least one characteristic in common with each of the other devices in the first group.

3. The method of claim 2, wherein the devices in the first group are infrared cameras and the devices in the second group are color cameras.

4. The method of claim 1, further comprising
    connecting the first group of devices and the second group of devices to a host.

5. The method of claim 4, further comprising
    generating a network communication layer between the host and the first group of devices and the second group of devices.

6. The method of claim 5, wherein the network communication layer uses User Datagram Protocol (UDP).

7. A video system, comprising:
    a host device;
    a first plurality of devices coupled to the host device, wherein each device in the first plurality of devices has at least one first device setting,
    wherein the host device sends the at least one first device setting to each device in the first plurality of devices in parallel, so that each device in the first plurality of devices changes at least one device setting according to the at least one received first device setting,
    wherein the at least one received first device setting is sent in parallel using a first group of task queues to increase speed and remove mismatching configurations of the first group of devices;
    a second plurality of devices coupled to the host device, wherein each device in the second group has at least one second device setting, wherein each device in the second plurality of devices is not in the first plurality of devices,
    wherein the host device sends the at least one second device setting to each device in the second plurality of devices in parallel, so that each device in the second plurality of devices changes at least one device setting according to the at least one received second device setting,
    wherein the at least one received second device setting is sent in parallel using a second group of task queues to increase speed and remove mismatching configurations of the second group of devices.

8. The system of claim 7, wherein each device in the first plurality of devices has at least one characteristic in common with each of the other devices in the first plurality of devices.

9. The system of claim 7, wherein the first plurality of devices includes infrared cameras and the second plurality of devices includes color cameras.

10. The system of claim 9, further comprising
    a third plurality of devices including monochrome cameras.

11. The system of claim 7, further comprising
    a network communication layer configured between the host and the first plurality of devices and the second plurality of devices using User Datagram Protocol (UDP).

12. The system of claim 7, further comprising
    a remote node coupled to the host device.

13. The system of claim 12, wherein at least one device of the first plurality of devices and the second plurality of devices is coupled to the host device through the remote node.

14. A non-transitory computer-readable storage medium storing a computer program to manage device settings on multiple devices, the computer program comprising executable instructions that cause a computer to:
    generate a first group of devices including two or more devices, wherein each device in the first group has at least one first device setting;
    generate a second group of devices including two or more devices, wherein each device in the second group has at least one second device setting and each device in the second group is not in the first group;

transmit the at least one first device setting to each device in the first group of devices in parallel, so that each device in the first group changes at least one device setting according to the at least one received first device setting, wherein the at least one received first device setting is transmitted in parallel using a first group of task queues to increase speed and remove mismatching configurations of the first group of devices; and transmit the at least one second device setting to each device in the second group of devices in parallel, so that each device in the second group changes at least one device setting according to the at least one received second device setting, wherein the at least one received second device setting is transmitted in parallel using a second group of task queues to increase speed and remove mismatching configurations of the second group of devices.

15. The non-transitory computer-readable storage medium of claim 14, further comprising executable instructions that cause the computer to connect the first group of devices and the second group of devices to a host.

16. The non-transitory computer-readable storage medium of claim 15, further comprising executable instructions that cause the computer to generate a network communication layer between the host and the first group of devices and the second group of devices using User Datagram Protocol (UDP).

* * * * *